United States Patent [19]

Nagai et al.

[11] Patent Number: 5,392,567
[45] Date of Patent: Feb. 28, 1995

[54] METHOD OF REMOVING AN EXPOSED CORD ON A POWER TRANSMISSION BELT, AN APPARATUS FOR CARRYING OUT THE METHOD, AND A POWER TRANSMISSION BELT MADE BY PRACTICING THE METHOD

[75] Inventors: Takaji Nagai; Toshiki Sawauchi, both of Kobe; Mitsuhira Ishihara, Okawa, all of Japan

[73] Assignee: Mitsuboshi Belting Ltd., Nagata, Japan

[21] Appl. No.: 887,345

[22] Filed: May 21, 1992

[30] Foreign Application Priority Data

May 31, 1991 [JP] Japan ................. 3-157826
Jun. 17, 1991 [JP] Japan ............. 3-054407[U]

[51] Int. Cl.⁶ ............................................ B24B 49/00
[52] U.S. Cl. ................................. 51/8; 451/10; 451/210
[58] Field of Search ............... 51/80 A, 87 R, 89, 74, 51/76 R, 78, 135 BT, 135 R, 165.76, 165.74

[56] References Cited

U.S. PATENT DOCUMENTS

| | | | |
|---|---|---|---|
| 2,671,992 | 3/1954 | Reaser | 51/80 A |
| 3,200,662 | 8/1965 | Rockoff et al. | 474/265 |
| 3,822,516 | 7/1974 | Huber | 51/326 |
| 3,848,369 | 11/1974 | Monajjem | 51/165.72 |
| 3,866,360 | 2/1975 | Monajjem | 51/165.72 |
| 4,053,237 | 10/1977 | Casey | 51/165.72 |
| 4,060,937 | 12/1977 | Glazer | 51/80 A |
| 4,267,671 | 5/1981 | Rettew | 51/135 BT |
| 4,322,916 | 4/1982 | Richmond | 51/78 |
| 4,502,250 | 3/1985 | Delso | 51/80 A |
| 4,523,409 | 6/1985 | De Fazio | 51/165.72 |
| 4,633,620 | 1/1987 | Lorenzi et al. | 51/165.72 |
| 4,658,550 | 4/1987 | Myers | 51/80 A |
| 4,864,776 | 9/1989 | Morrison | 51/165.76 |

FOREIGN PATENT DOCUMENTS

| | | |
|---|---|---|
| 54-10344 | 8/1980 | Japan . |
| 54-80943 | 1/1981 | Japan . |
| 63-167259 | 1/1990 | Japan . |

Primary Examiner—Maurina T. Rachuba
Attorney, Agent, or Firm—Wood, Phillips, VanSanten, Clark & Mortimer

[57] ABSTRACT

A method of removing a portion of a cord that is exposed on the side surface of a power transmission belt. The method consists of the steps of providing an endless power transmission belt having inside and outside surfaces, laterally oppositely facing side surfaces, and a cord exposed on at least a part of one of the side surfaces. The belt is run in an endless path. The cord that is exposed on the part of the one side surface is ground as the belt is run without grinding the entirety of the one side surface of the belt. The invention is also directed to an apparatus for carrying out the above method and a power transmission belt having a portion of at least one of its side surfaces cut out/ground where a cord was exposed.

21 Claims, 2 Drawing Sheets

METHOD OF REMOVING AN EXPOSED CORD ON A POWER TRANSMISSION BELT, AN APPARATUS FOR CARRYING OUT THE METHOD, AND A POWER TRANSMISSION BELT MADE BY PRACTICING THE METHOD

BACKGROUND OF THE INVENTION

1. Field of the Invention

The present invention relates to power transmission belts of the type having longitudinally extending, load carrying cords and, more particularly, to a method of removing that portion of the load carrying cords directly exposed at the side surfaces of the belts that are otherwise prone to fraying and/or being separated for the belt during operation. The invention is further directed to an apparatus for automatically removing the exposed cords. The present invention is still further directed to a power transmission belt in which otherwise exposed cords are cut out/ground at the side surfaces of the belt to prevent the aforementioned problem of fraying.

2. Background Art

It is known to sequentially build up belt components on a forming drum to define a belt sleeve, to vulcanize the sleeve, and to divide the vulcanized sleeve into a plurality of individual belts. Such a process is commonly used to form synchronous belts, V-ribbed belts, and V-belts. One component of each of these belts is a load carrying cord, which defines the neutral axis for the belt. Typically, the cord is spirally wound over underlying belt components on the drum. Cutting of the individual belts results in exposure of the load carrying cord at the side surfaces of each belt. The extent of exposure depends upon the tightness of the spiral in which the cord is wrapped. In any event, the cord is generally exposed at less than the entire longitudinal extent of the side surfaces of the belt and commonly at 2 or more discrete locations on each side surface of the belt. In those belts in which the side surfaces are not covered by a canvas layer, or the like, the exposed cord repeatedly contacts cooperating pulleys during operation. The frictional forces between the cord and pulley give rise to a raised nap and/or frayed spots. This may result in system vibration during operation.

Another problem with those conventional belts having exposed cords is that the exposed cords are prone to being pulled out of the rubber in which they are embedded. This may not only result in significant, unwanted vibration, but may also compromise the integrity of the belt.

It is known to use polyester fiber for load carrying cords. One proposed solution to the fraying problem associated with polyester fiber cords is disclosed in U.S. Pat. No. 3,200,662. In this patent, it is taught to fuse the frayed cords by heating the cords to a temperature higher than the melting point of the fiber therein.

Aramid fiber has been used to manufacture load carrying cords in power transmission belts due to its good tensile strength, resistance to elongation and good bending characteristics. Aramid fiber load carrying cords have been used increasingly in synchronous transmission toothed belts that are run at high speed and severely bent in operation. The aramid fiber cords are also prone to fraying and/or fluffing upon repeatedly contacting the cooperating pulleys. While the aramid fiber cords have many desirable characteristics that make them suitable for use in power transmission belts, the binding force of the individual fibers defining the cords is relatively weak, making the cord fibers prone to unwrapping. This phenomenon occurs even in belts in which the aramid fiber load carrying cords are embedded and firmly bonded within a rubber layer of the belt. What starts as fraying of the exposed portion of the cords may ultimately result in the individual fibers separating from each other and being pulled out of the belt as the cords repeatedly contact cooperating pulleys. The withdrawn fibers may wrap around the belt, the cooperating pulleys and/or the related machinery. This results in potential damage to the belt and/or the machine as well as resulting in the inducement of vibration to the operating system if not ultimate failure of the system.

Various solutions have been proposed to overcome the fraying and fiber separation problems noted above. Most of these solutions involve the enhancement of the fiber bonding force by treatment of the cords. For example, in Japanese Patent Publication No. 31015/1982, a method is disclosed in which the exposed load carrying cords are solidified with an adhesive.

In Japanese Patent Publication No. 26700/1985, a treatment for aramid fiber cords is disclosed in which the cords are immersed in an aqueous solution of polyvinyl alcohol, vinyl acetate or gum arabic, or a solvent solution of acrylic ester. The cords are dried after such treatment.

Generally, enhancing the binding force by an adhesive treatment causes the bending fatigue resistance of the cords to be diminished. The rigidified fibers generally become unsuitable for use in the load carrying cords of a power transmission belt. For example, since hard resin is used for the belt, the solidification of the exposed cord portions with ciano, urethane or epoxy adhesive can substantially rigidify the cords and the belt. The loss of flexibility is determined by the degree of penetration of the adhesive. Even if the aramid fiber cords are bound firmly with adhesive, after long periods of use, the fibers inside of the belt tend to separate from each other. Fraying occurs internally with only the external fibers, soaked in the adhesive, remaining adhered to the rubber. However, it has been found that even if a final twist coefficient is improved and a bonding treatment performed on the cords, the exposed cords eventually develop a raised nap or frayed portion which not only detracts from the appearance of the belt but may result in the withdrawal of the fibers from the belt.

One proposed solution to the above problem has been to manually take out the exposed cords on the side surfaces of the belt, as with a cutter. There are two significant drawbacks with this approach. First of all, it is very time consuming in that it requires the manual manipulation, inspection and cutting of each belt. This becomes very expensive to the manufacturer. Additionally, the procedure may be inconsistently performed on the belts. Localized damage may be inflicted on the belt at the side surface thereof, which may detract from the belt performance.

A still further known method of overcoming the problems of fraying is to arrange the cords so that there is no exposure thereof at the side surfaces of the belt. For example, in Japanese Patent Provisional Publication No. 17242/1990, a method of manufacture is disclosed in which the ends of the cords are not exposed at the belt side surfaces. The problem with this construction is that the strength of the belt is diminished by reason of the decrease in the number of cords along the width of the belt.

SUMMARY OF THE INVENTION

The present invention is specifically directed to overcoming the above-enumerated problems in a novel and simple manner.

The invention comprehends a method of removing a portion of a cord that is exposed on one of the side surfaces of a power transmission belt. The method consists of the steps of providing an endless power transmission belt having inside and outside surfaces, laterally oppositely facing side surfaces, and a cord exposed on at least a part of one of the side surfaces. The belt is run in an endless path. The cord that is exposed on the part of the one side surface is ground as the belt is run, without grinding the entirety of the one side surface of the belt.

By reason of grinding/cutting out the exposed cord, direct contact between the cord and cooperating pulley is eliminated. As a result, the problems of fraying and working loose of the cord fibers are obviated without having to treat the cords as might adversely alter the characteristics thereof. At the same time, the appearance of the belt is improved. Still further, by grinding less than the entirety of the one side surface of the belt, the integrity of the belt is maintained.

To minimize the removal of material from the side surface of the belt, the invention further contemplates the step of sensing the presence of the exposed cord at the one side surface and grinding the one side surface and the cord thereat only upon the sensing of the presence of the exposed cord.

In one form, a grinding mechanism is provided and is moved selectively towards the one side surface, in response to sensing the presence of an exposed cord thereat, and away from the one side surface in the absence of sensing the presence of an exposed cord thereat.

To operate the belt in the endless path, in a preferred form, the belt is trained around first and second spaced pulleys. At least one of the pulleys is driven to effect running of the belt.

To facilitate accurate cutting of only the exposed part of the cord, the running belt is stabilized at a location between the first and second pulleys and preferably at the location where the grinding is performed. In one form, opposing rollers are provided to act against the inside and outside surfaces of a belt to thereby effect stabilization.

To further control the positioning of the belt relative to the grinding mechanism, the first and second pulleys can have flanges thereon with a spacing substantially equal to the width of the belt. This prevents shifting of the belt laterally thereof relative to the grinding mechanism. Further stability is afforded by repositioning the first and second pulleys to thereby tension the unsupported portion of the belt between the first and second pulleys so as to further facilitate grinding.

To improve the efficiency of the grinding operation, in one form, separate grinding mechanisms are provided to simultaneously act on the opposite side surfaces of the belt. Each is associated with a separate sensor to be movable independently towards and away from its respective belt side surface.

In one form, the grinding mechanism(s) includes a rotary grinding wheel to act against the side surface of the belt. In a preferred form, the grinding wheel has a rotary axis that is substantially parallel to the axes of the first and second pulleys. The dimension of the grinding wheel taken along its axis is not substantially greater than the diameter of the cord exposed at the belt side surface. This makes possible the removal of the cord without significant removal of the rubber layer in which the cord is embedded so as not to compromise the belt's performance.

In a preferred form, the belt is run in a first direction and the grinding wheels operated so as to engage the belt and move against the belt in a direction opposite to the first direction. The invention also comprehends rotation of the grinding wheels in the same direction as the belt is advanced. A sensing mechanism is provided to produce a signal in response to sensing the presence of an exposed cord. The grinding mechanism(s) is activated/deactivated as an incident of the signal generation by the sensor, upon its detecting the presence/absence of an exposed cord.

The inventive method has utility for all types of belts, to include synchronous belts, V-belts and V-ribbed belts.

The invention further contemplates an apparatus for removing a portion of a cord that is exposed on a side surface of a power transmission belt and having a belt supporting structure on which an endless power transmission belt can be trained and run in an endless path, a sensor to detect the presence of a cord exposed on the side surface of a belt running on the belt supporting structure, a grinder for the side surfaces of the belt, and a mechanism for selectively activating and deactivating the grinder in response to sensing the presence and absence of an exposed cord.

Preferably, the grinder has a rotatable grinding wheel which is activated by being moved against the side surface of a running belt and deactivated by being moved away from the belt side surface.

Preferably, the belt supporting structure has spaced pulleys about which the belt is trained, with the pulleys being movable selectively towards and away from each other to alter the tension on the belt. A greater tension on the belt results in greater stability of the belt between the pulleys, at which location the side surfaces are preferably ground.

To further stabilize the running belt, first and second cooperating rollers are provided to act on the inside and outside surfaces of the belt. This prevents shifting of the belt and allows precision grinding of only that portion of the belt side surface at which the cord is exposed. The stabilizing structure preferably includes first and second cooperating rollers defining a space therebetween for reception of a belt running on the belt supporting structure.

The invention further contemplates the combination of the above apparatus and an endless power transmission belt having load carrying cords extending lengthwise of the belt, inside and outside surfaces, and laterally spaced side surfaces.

In a preferred form, the load carrying cords are made from aramid fiber.

In one form, the apparatus has a frame with a supporting plate that is mounted to the frame for movement in two transverse directions relative to the frame. The grinder is preferably mounted on a supporting plate to follow movement thereof.

In one form, one of the rollers in the stabilizing roller pair is fixed while the other is movable selectively towards and away from the fixed roller.

The invention further contemplates a power transmission belt having a body with a tension/outer section and a compression/inner section and defining laterally oppositely facing side surfaces. A load carrying cord defines a neutral axis for the belt. At least a portion of the load carrying cord is cut to define a recess at at least one of the side surfaces of the belt to thereby prevent direct contact between the load carrying cord at the recess and a pulley with which the belt cooperates.

The load carrying cord, in one form, is made from aramid fiber.

The belt has a longitudinal extent. In a preferred form, the recess does not extend continuously along the length of the one side surface and is not significantly deeper, in a lateral direction, than the diameter of the cord.

In one form, the belt has a plurality of teeth with a constant pitch spaced longitudinally of the belt.

DETAILED DESCRIPTION OF THE DRAWINGS

Figure 1:
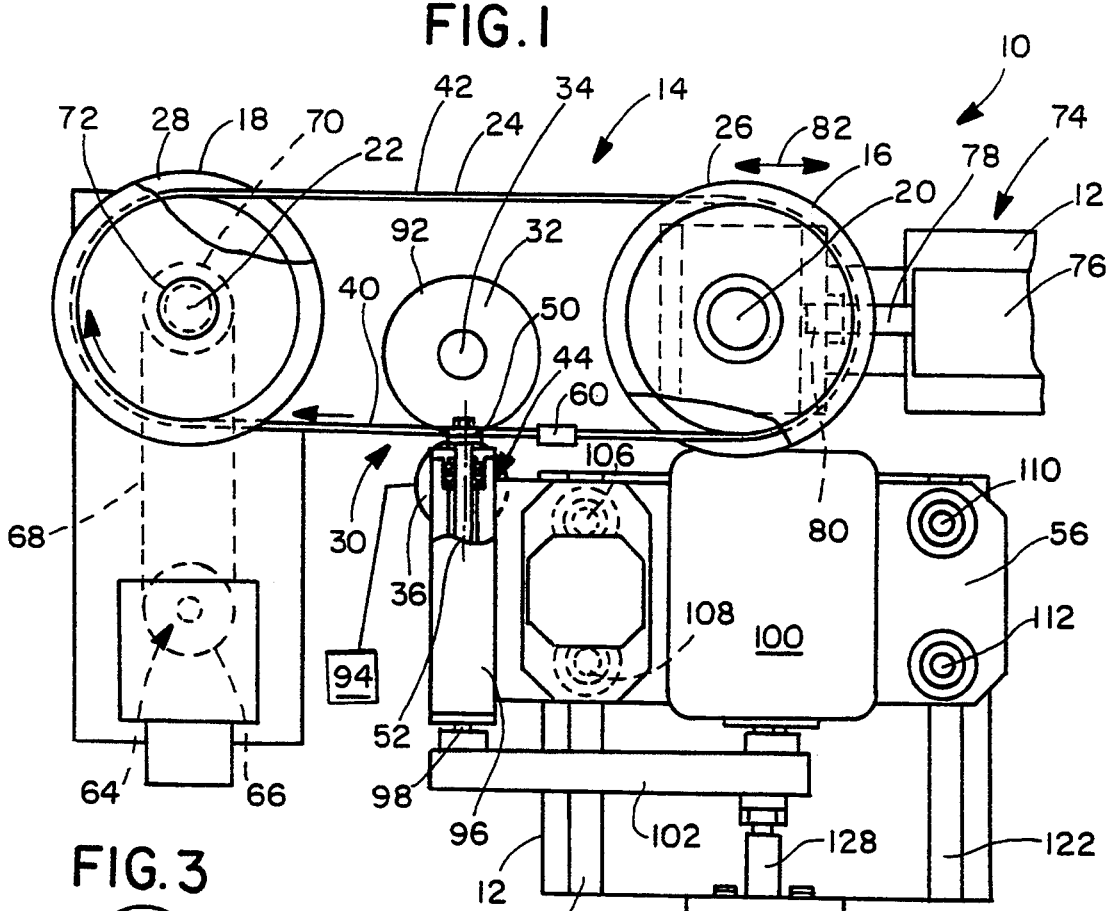
FIG. 1 is a plan view of an apparatus, according to the present invention, for removing a portion of a cord that is exposed on the side surface of a power transmission belt.
Figure 2:
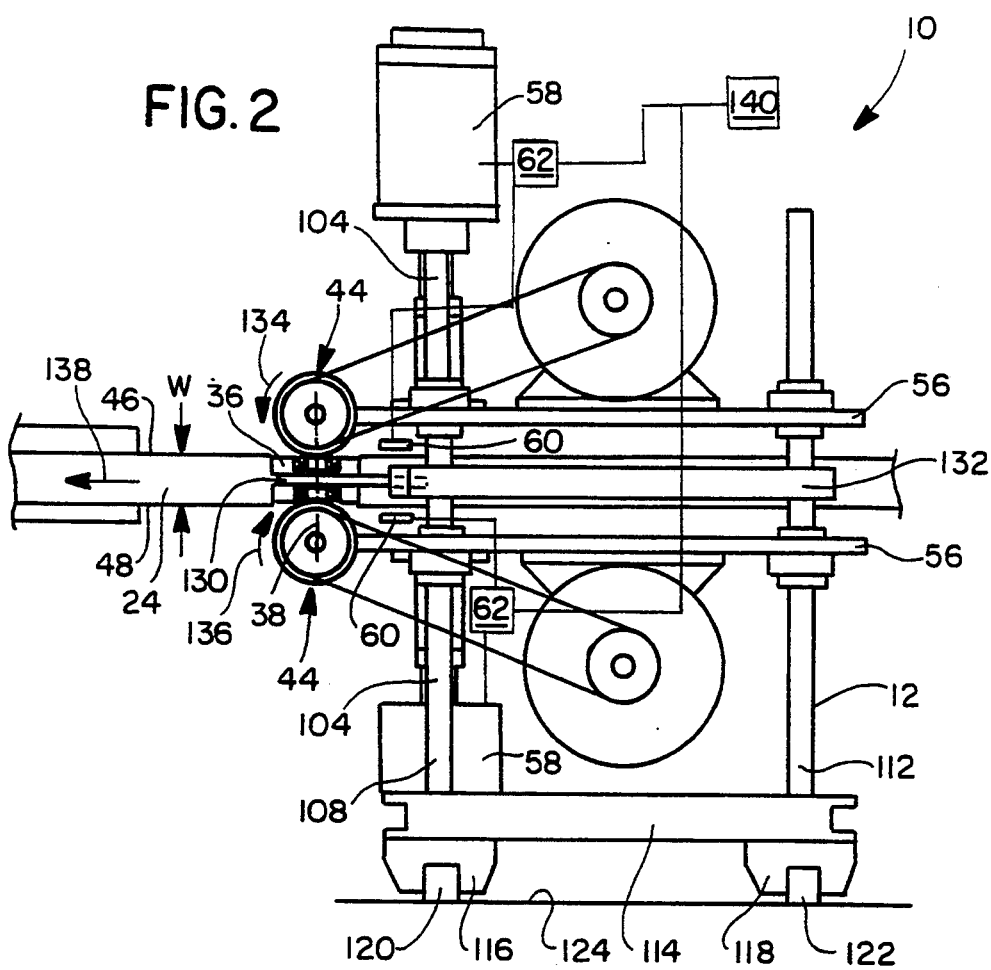
FIG. 2 is a side elevation view of the apparatus in FIG. 1.

In FIGS. 1 and 2, an apparatus, according to the present invention, is shown at 10 for removing a portion of a cord that is exposed on the side surface of a power transmission belt. The apparatus 10 has a frame 12 upon which the various components of the apparatus 10 are supported.

The apparatus 10 has a belt running section 14, having first and second spaced pulleys 16, 18 rotatable about spaced, parallel axes 20, 22, respectively. An endless, power transmission belt 24 is trained around the pulleys 16, 18 so as to permit running thereof in an endless path around the pulleys 16, 18. The pulleys 16, 18 have axially spaced flanges 26, 28, (one shown on each pulley 16, 18). The flanges 26, 28 define a groove on each pulley 16, 18 approximately equal to the width W (FIG. 2) of the power transmission belt 24 to be operated on by the apparatus 10. The flanged pulleys 16, 18 prevent vertical shifting of the power transmission belt 24 relative to the pulleys 16, 18 to thereby facilitate precision grinding of the power transmission belt 24, as described below.

Further stability is provided for the running belt 24 by a stabilizing roller pair 30 provided at an unsupported belt portion midway between the pulleys 16, 18. The roller pair 30 consists of a fixed roller 32, which is rotatable about a fixed axis 34 that is generally parallel to the axes 20, 22 of the pulleys 16, 18, and a press roller 36, that is rotatable about an axis 38 that is substantially parallel to the axis 34 of the roller 32. As described in greater detail below, the press roller 36 is movable in a direction perpendicular to its axis selectively towards and away from the roller 32 to selectively diminish and enlarge the space between the rollers 32, 36. The rollers 32, 36 are arranged so that the fixed roller 32 acts against an inside surface 40 on the running belt 24, with the press roller 36 acting against an outside surface 42 of the belt 24. The opposing surfaces on the rollers 32, 36 cooperatively prevent shifting of the belt in an inside-outside line i.e. in a direction perpendicular to the plane containing the pulley axes 20 22.

Figure 4:
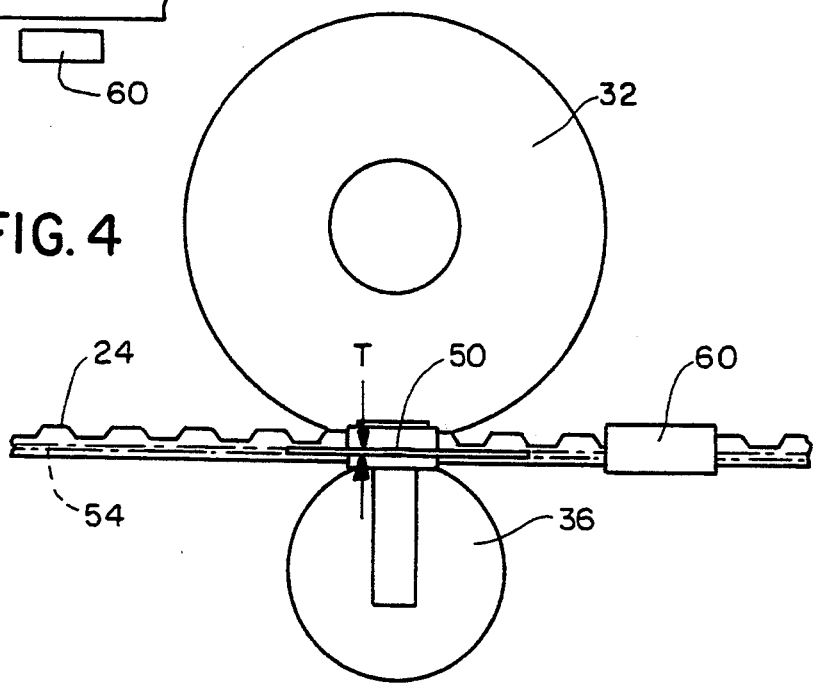
FIG. 4 is an enlarged, fragmentary, plan view of stabilizing rollers and a grinding mechanism shown in relationship to a belt on the inventive apparatus.

The grinding mechanisms 44 are provided, one each at the opposite side surfaces 46, 48 of the belt 24, in the vicinity of the stabilizing roller pair 30. Each grinding mechanism 44 has a grinding wheel 50 that is rotatable about an axis 52 that is substantially perpendicular to the axes 20, 22 of the pulleys 16, 18. As seen most clearly in FIG. 4, each grinding wheel 50 has a thickness T that is not substantially larger than the diameter of a load carrying cord 54 in the belt 24. The grinding wheel 50 is designed to remove primarily the portion of the cord 54 that is exposed at the belt side surfaces 46, 48, without removing additional portions of the belt that might compromise the integrity thereof.

The grinding mechanisms 44 are carried one each on vertically spaced supporting plates 56, with one such plate 56 being provided above the belt in FIG. 2 and one such plate 56 being provided below the belt 24 in FIG. 2. Through a motor 58, the plates 56 are vertically movable towards and away from each other to selectively activate and deactivate the grinding mechanisms 44. This movement is dictated by sensors 60, provided one each at the separate side surfaces 46, 48 of the belt 24. The sensors 60 are constructed to sense the presence of an exposed load carrying cord 54 at the side surfaces 46, 48 of the belt 24 and to produce a signal to a controller 62 which directs operation of the motor 58 to independently move the grinding wheels 50 towards and away from the belt side surfaces 46, 48. As a result, the belt side surfaces 46, 48 can be ground at only those locations where the load carrying cord 54 is exposed. The details of the above described system will now be described.

To effect driving of the belt 24 at the belt running section 14, a prime mover 64 is provided and includes a drive pulley 66 which rotates the pulley 18 through a power transmission belt 68 trained around the pulley 66 and a pulley 70 fixed to the shaft 72 carrying the pulley 18.

The driven pulley 16 is movable selectively towards and away from the drive pulley 18 by a tensioning mechanism 74. The tensioning mechanism 74 has an operating cylinder 76 fixed to the frame 12. The operating cylinder 76 selectively extends and retracts a shaft 78. The free end 80 of the shaft 78 is connected to the pulley 16 so that extension and retraction of the shaft 78 effects reciprocating movement of the pulley 16 in the line of double-headed arrow 82, selectively towards and away from the pulley 18.

By directly the pulley 16 towards the pulley 18, mounting of the belt 24 on the pulleys 16, 18 is facilitated, as is the removal of the belt 24 after completion of the grinding operation. The tensioning mechanism 74 allows a desired tension to be placed on the running belt 24 to cause it to consistently run in a straight line.

The belt 24 which operates on the running section 14 may take a variety of different forms. For example, the belt 24 can be a synchronous belt, a V-belt, a V-ribbed belt, etc. The invention is designed mainly to operate on belts having a cut edge; that is belts that have exposed side surfaces 46, 48 that are uncovered by any layer such as canvas fabric.

Figure 5:
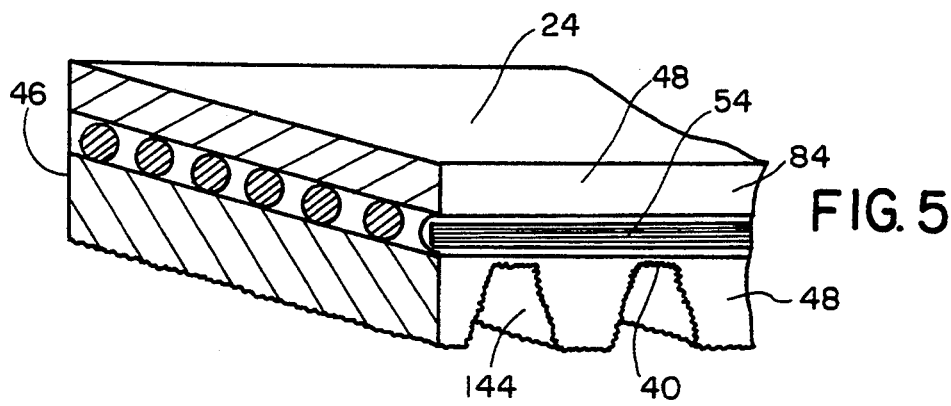
FIG. 5 is a fragmentary perspective view of a synchronous power transmission belt with a load carrying cord therein exposed at a recess formed in a side surface of the belt.
Figure 6:
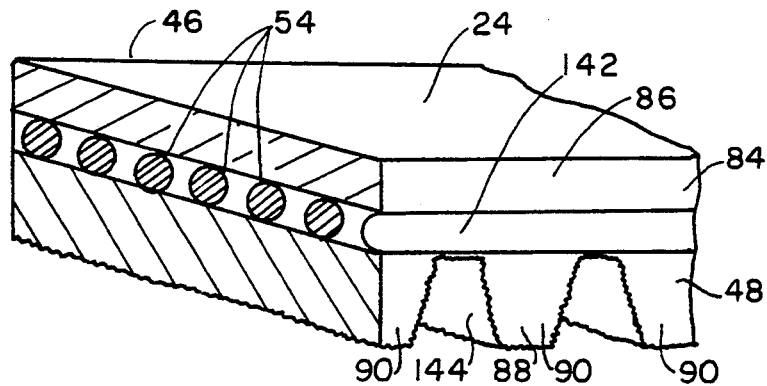
FIG. 6 is a view as in FIG. 5 with the exposed portion of the cord completely removed at the side surface of the belt so as to leave an empty recess.

An exemplary synchronous belt 24 is shown in detail in FIGS. 5 and 6. The belt 24 has a body 84 defining a outer section 86 and inner section 88. The inner section 88 has a plurality of teeth 90 spaced at regular intervals lengthwise of the belt 24. In a V-belt or V-ribbed belt, the corresponding outer section 86 would be a tension section and the corresponding inner section 88 would be a compression section. Laterally spaced, load carrying cords 54 define the neutral axis for the belts 24.

It is known to construct a belt such as the belt 24 in FIGS. 5 and 6 by sequentially building components up on a forming drum to provide a belt sleeve from which a plurality of belts are ultimately cut. The load carrying cord component 54 is applied by wrapping a cord around the forming drum (not shown) in a spiral pattern. Upon completion of the sleeve formation, the sleeve is normally vulcanized and thereafter the individual belts 24 are cut from the sleeve. This cutting step exposes the cords 54 at only spaced locations spaces along the length of the belt side surfaces 46, 48, as shown in FIG. 5.

The present invention is directed to grinding out primarily the exposed portion of the cords 54 at the belt side surfaces 46, 48. It is an object of the invention to completely remove the exposed cords 54 so that they are not prone to fraying or dislodging during use while minimizing the removal of other portions of the belt. Consequently, precision is a significant objective of the present invention, and it is therefore important to consistently run and effectively stabilize the belt 24 during a grinding operation.

While the tensioning of the belt 24, through the mechanism 74, affords a certain amount of stability for the belt 24, the primary stabilizing function is accomplished by the roller pair 30. The fixed roller 32 preferably has axially spaced flanges 92 (one shown) to define a groove to closely accept the width of the belt 24. Thus the roller 32 maintains the belt 24 at a constant height between the pulleys 16, 18. Accordingly, the belt 24 at all times travels in a substantially linear path so that it is not bent or twisted as might alter its alignment with the grinding mechanisms 44. To prevent the running belt 24 from fluttering, the press roller 36 is biased by a spring mechanism, shown schematically at 94, against the outside belt surface 42 to thereby press the belt 24 into the groove defined by the roller 32. The roller pair 30 thus holds the belt 24 in a precise location midway between the pulleys 16, 18 to be operated on by the grinding mechanisms 44.

The grinding mechanisms 44 are substantially the same both above and below the running belt 24. Accordingly, only the representative grinding mechanism 44 located above the running belt 24 will be described. The grinding wheel 50 is journalled for rotation in a housing 96 carried on the supporting plate 56. The shaft 98 carrying the wheel 50 projects through the housing 96 to be driven by a motor 100, carried on the supporting plate 56, through a power transmission belt 102. The plate 56 is operatively connected to a shaft 104 that is selectively extended and retracted by the motor 58 to thereby lower and raise the supporting plate 56. Raising of the upper supporting plate 56 deactivates the grinding mechanism 44 by moving the grinding wheel 50 on the grinding mechanism 44 away from the side surface of the belt 24. The grinding mechanisms 44 are arranged so that the rotational axes of the grinding wheels 50 thereon are in vertical coincidence.

The invention also contemplates that the grinding wheels 50 be adjustable along their rotational axes i.e. between the inside surface 40 and outside surface 42 of the running belt 24. To facilitate this, four vertically extending, parallel guide rods 106, 108, 110, 112 are provided. The rods 106, 108, 110, 112 project through each of the supporting plates 56 and guide vertical movement thereof. The lower portions of the rods 106, 108, 110, 112 are fixed to a base plate 114. The base plate 114 has associated guide blocks 116, 118 to cooperate with guide rails 120, 122 on a surface 124 which supports the apparatus 10. The base plate 114 is movable lengthwise relative to the rails 120, 122 by a drive motor 126, which selectively extends and retracts a shaft 128 attached to the base plate 114. This alters the position of the grinding wheels 50 between the inside surface 40 and outside surface 42 of the belt 24.

The grinding wheels 50, in a preferred form, have a grinding surface electro-deposited with diamond having a grain size between No. 80 and No. 120. Alternatively, grindstones having a high hardness WA grinding material may be utilized. The cutting edge may have a rounded surface to engage the belt 24 so as to produce a U-shaped cut in the belt in conformity with the contour of the cord 54. Alternatively, the grinding surface can be flat. Slits may be provided at spaced intervals around the periphery of the cutting surface of the wheel 50. Preferably, the width of the grinding wheels 50 i.e. their axial extent, is between 0.4 and 1.0 mm.

The grinding wheels 50, as previously noted, are activated and deactivated in response to a signal from the sensors 60. The sensors 60 are preferably photoelectric switches that detect the presence of an exposed cord 54. More particularly, the sensors are chosen to detect the color of the load carrying cord's being different than the color of the rubber in which the load carrying cords 54 are embedded. Generally, the cord 54 is exposed in two to three places around the length of the belt 24 at each side surface 46, 48. This location varies on the opposite side surfaces 46, 48 for the belt which makes desirable the independent operation of the grinding mechanisms 44. In the absence of this independent operation, it is possible that one of the grinding mechanisms 44 might dig up exposed cord that is otherwise fully embedded, thereby giving rise to the problem of fraying and dislodging of the cord fibers. Further, the belt 24 could be otherwise weakened by reason of the grinding out of the material other than the cord 54.

Accordingly, it is an important feature of the present invention to identify the presence of the cord 54 that is exposed at the side surfaces 46, 48 and to grind only the exposed cord portions out of the belt 24. To accomplish this, the sensors 60 are situated upstream of the grinding mechanisms 44. Once a sensor 60 detects the presence of an exposed cord 54, the sensor 60 causes the signal receiving controller 62 to operate the associated motor 100 to activate the grinding mechanism 44. Once the entire extent of the exposed cord 54 is ground out, the motor 58 retracts/deactivates the grinding mechanism 44. The press roller 36 is mounted on a bracket 130 fixed to the end of a rod 132. The rod 132 is slidable guidingly over the rods 106, 108, 110, 112 and is movable with the supporting plates 56 lengthwise of the rails 120, 122. The force of the spring 94 determines in part the amount of pressure applied by the press roller 36 against the belt 24.

Detailed operation of the apparatus 10 will be described below. Initially, the tensioning mechanism 74 is operated to advance the driven pulley 16 towards the drive pulley 18. A belt 24 is then trained around the pulleys 16, 18. Thereafter, the tensioning mechanism 74 is operated to move the pulley 16 away from the pulley 18 to thereby exert a tension on the mounted belts 24. The belt tension is preferably in the range of 40 to 100 kg. At the same time, the fixed roller 32 is engaged with the inside surface 40 of the belt 24.

The prime mover 64 and grinding motors 100 are then activated. The prime mover 64 is set to rotate the belt 24 with a peripheral velocity of 5 to 20 mm per second. The drive motor 126 is then operated to reposition the base plate 114 so as to situate the cutting surfaces of the grinding wheels 50 at the location of the cords 54 in the belt 24. This movement of the base plate 114 also situates the press roller 36 against the outside surface 42 of the belt 24. Preferably, the pressure exerted by the press roller 36 on the belt 24 is between 15 to 30 kg.

Figure 3:
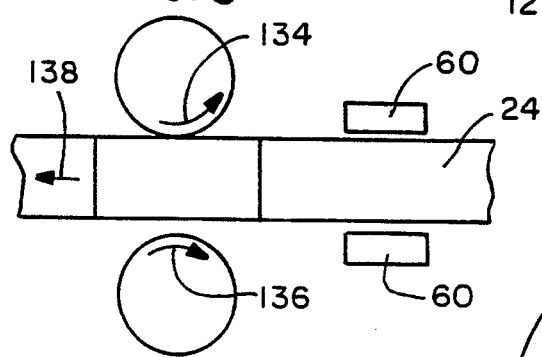
FIG. 3 is an enlarged, fragmentary, side elevation view of cord sensing and grinding mechanisms in relation to a power transmission belt on the apparatus in FIGS. 1 and 2.

The activated sensors 60, upon detecting the presence of an exposed portion of the load carrying cord 54 at the belt side surfaces 46, 48, activate the motor 58 on that side of the belt 24 on which the exposed cord 54 is detected to advance a grinding mechanism 44 on that side towards the belt 24 to bring the grinding wheel 50 into engagement with the exposed cord 54 on the belt side surface 46, 48. The grinding wheels 50 are rotated in the direction of arrows 134,136, as shown in FIGS. 2 and 3, which direction is opposite to the direction of advancement of the belt, as shown by arrow 138 in those same figures. The invention also comprehends rotation of the wheels 50 in the same direction as the belt 24 advances. The abutting pressure of the grinding wheel 50 preferably does not exceed 20 kg. A preferred range of pressure is between 5 and 10 kg.

The wheels 50 positively grind the load carrying cord 54 at the belt side surface 46, 48. Positive grinding results in the complete digging out of the cord 54 without wrapping of the cord fibers around the grinding wheel 50.

A timer mechanism, shown schematically at 140 in FIG. 2, determines when the entire length of the belt 24 has been operated on by the apparatus 10. Once this occurs, the grinding wheels 50 are retracted and the prime mover 64 is stopped to halt the running of the belt 24. The tensioning mechanism 74 is then operated to advance the pulley 16 towards the pulley 18 to relax the tension on the belt 24. At the same time, the drive motor 126 is operated to move the grinding wheels 50 downwardly away from the belt 24. All of the above mentioned steps occur in an automatic sequence. Thereafter, the completed belt 24 can be removed from the apparatus 10.

The invention is also directed to a belt 24 to be produced by practicing the inventive method. While the inventive method can be practiced using any type of power transmission belt with an exposed side surface, the details of an exemplary synchronous belt, as shown in FIGS. 5 and 6 herein, will be described in detail.

The belt 24 in FIGS. 5 and 6 has cords 54 made from aramid fiber. The synchronous belt 24 shown typically has the load carrying cords 54 accurately positioned on the pitch line for the belt 24 so that precise grinding of only the exposed portions of the cords 54 can be carried out.

In FIG. 6, the side surface 48 of the belt 24 has been ground out according to the invention to thereby leave a recess 142 in the belt side surface 48. As can be seen, the cross section of the recess 142 is U-shaped resulting from the use of a grinding wheel 50 with a curved cutting surface. The recess 142 in FIG. 6 is formed so as to completely remove the exposed cord 54. In FIG. 5, the cord exposed at the belt side surface 84 is only partially ground so as to reside entirely within the recess. That is, it is spaced laterally inwardly from the belt side surface 48.

In a preferred form, the rubber in the outer section 86 and inner section 88 is a rubber with good heat resistance, such as chloroprene rubber (CR), chlorosulfonated polyethylene rubber (CSM), alkylated chlorosulfonated polyethylene rubber (ACSM), or acrylonitrile hydride-butadiene rubber (also identified as hydrogenated nitrile rubber identified by H-NBR), obtained by adding at least 80 weight percent of hydrogen to the double bonded portion of acrylonitrile-butadiene rubber.

A cover canvas 144 is provided on the inside surface 40 of the belt 24 over the teeth 90. The cover canvas 144 may be plain weave, twill or satin fabric stretchable in the direction of the warp i.e. the longitudinal direction of the belt. The canvas fabric has warp and weft yarns that alternatingly cross over and under each other at every intersection of the warp and weft yarns. On the other hand, twill or satin fabric normally have crossing warp and weft yarns which alternate over and under at less than every intersection. The result of this is that the rubber with which the canvas 144 is commonly impregnated, permeates not only the areas bounded by the yarn but the space between the warp and weft yarns at points of intersection. The rubber between the yarns at the intersection points prevents direct contact between the warp and weft yarns, as when the belt is bent. This contributes to the longevity of the belt. Because of this feature, twill and satin fabrics are preferred for the cover canvas 144.

The cords 54 are preferably made up of 100 to 3000 filaments, each of 1 to 3 denier, which are twisted into a raw cord of 300 to 3100 denier. The filaments of the raw cord are bonded together by adhesive treatment in a liquid that is preferably one of epoxy or isocyanate compounds. This treatment increases the binding force of the filament, to reduce the possibility of fraying. The twisted filaments are then subjected to an RFL treatment, followed by an overcoating with rubber paste. Alternatively, the cord 54 can be directly overcoated with a rubber paste. The bonding treatment utilizing the rubber paste can be repeated, if necessary.

The aramid fiber in the cords 54 contains aromatic rings in the major chains of the molecular structure. Products suitable for constructing the load carrying cords 54 are commercially available and sold under the following trademarks: KONEX ™, NOMEX ™, KEVLAR ™, TECHNOR ™ and TWARON ™.

The foregoing disclosure of specific embodiments is intended to be illustrative of the broad concepts comprehended by the invention.

We claim:

1. In combination:
   a) an endless power transmission belt having a length, inside and outside surfaces, and laterally spaced side surfaces, said belt further having a body with a cord embedded therein; and
   b) an apparatus for removing a portion of the cord that is exposed on a surface of the power transmission belt, said apparatus comprising:
   a supporting structure on which the endless power transmission belt is trained and run in an endless path;
   means for sensing the presence of the cord exposed on the surface of the belt running on the belt supporting structure and for producing a signal indicative of the presence of the cord exposed on the surface of the belt;
   means for grinding the surface of the belt running on the belt supporting structure; and
   means for selectively a) activating the grinding means in response to the signal from the sensing means sensing the presence of the cord exposed on the side surface of the belt running on the belt supporting structure and b) deactivating the grinding means in response to the sensing means not sensing the presence of the cord exposed on the surface of the belt running on the belt supporting structure and not producing the signal indicative of the presence of the cord exposed on the surface of the belt, whereby the grinding means can be controlled to grind the belt surface only where an exposed portion of the cord is sensed by the sensing means.

2. The combination according to claim 1 wherein the grinding means includes a grinding wheel rotatable about an axis.

3. The combination according to claim 2 wherein the belt supporting structure comprises first and second spaced pulleys each rotatable about an axis and the axes of the first and second pulleys are substantially perpendicular to the axis of the grinding wheel.

4. The combination according to claim 1 wherein the belt supporting structure comprises first and second spaced pulleys and including means for stabilizing the belt running on the belt supporting structure between the first and second pulleys.

5. The combination according to claim 4 wherein the stabilizing means comprises first and second cooperating rollers with a space therebetween for reception of the belt running on the belt supporting structure.

6. The combination according to claim 3 wherein the means for activating and deactivating comprises means for moving the grinding wheel selectively towards and away from the belt on the belt supporting structure.

7. The combination according to claim 1 including means adjacent to the grinding means for stabilizing the belt running on the belt supporting structure.

8. The combination according to claim 7 wherein the stabilizing means comprises first and second cooperating rollers between which the belt running on the belt supporting structure operates.

9. The combination according to claim 3 including means for urging one of the first and second pulleys away from the other of the first and second pulleys with a variable force to alter the tension on the belt running on the belt supporting structure.

10. The combination according to claim 2 wherein said grinding wheel has an axial dimension that is less than the distance between the inside and outside belt surfaces.

11. The combination according to claim 10 wherein the load carrying cords have a diameter and the axial dimension of the grinding wheel is not substantially larger than the diameter of the load carrying cords.

12. The combination according to claim 10 wherein the load carrying cords are made from aramid fiber.

13. The combination according to claim 12 wherein the power transmission belt is one of a V-belt, V-ribbed belt, and synchronous belt.

14. In combination
   a) an endless power transmission belt having a length, inside and outside surfaces, and laterally spaced side surfaces, said belt further having a body with a cord embedded therein; and
   b) an apparatus for removing a portion of the cord that is exposed on the side surface of the power transmission belt, said apparatus comprising:
   a belt supporting structure on which the power transmission belt is trained and run in an endless path;
   means for grinding at least one side surface of the belt running on the belt supporting structure;
   means for sensing the presence of the cord exposed at the one side surface,
   said grinding means including a grinding wheel to grind the one side surface; and
   means for activating the grinding means in response to a signal from the sensing
   means upon the sensing means detecting the presence of the cord exposed at the one side surface,
   whereby the grinding means, sensing means, and activating means can be operated to sense and grind a cord exposed at the one side surface as the belt is continuously run on the belt supporting structure.

15. The combination according to claim 14 wherein the load carrying cord has a first diameter between the inside belt surface and the outside belt surface, the grinding wheel being dimensioned to engage the belt running on the belt supporting structure along a line between the inside and outside surfaces of the belt that is approximately equal to the first diameter.

16. The combination according to claim 14 including a frame, a supporting plate, means for mounting the supporting plate to the frame for movement in two transverse directions relative to the frame and means for mounting the grinding means on the supporting plate to follow movement of the supporting plate.

17. The combination according to claim 16 wherein the grinding means comprises a housing in which the grinding wheel is journalled for rotation and means for rotating the grinding wheel in the housing.

18. The apparation according to claim 14 wherein the belt supporting structure includes first and second flanged pulleys about which a belt can be trained.

19. The apparation according to claim 18 including belt stabilizing means comprising cooperating first and second rollers for capturing a belt on the belt supporting structure between the first and second pulleys, a frame, means for mounting one of the first and second rollers to the frame for rotation about a first fixed axis, and means for mounting the other of the first and second rollers to the frame for rotation about a second axis that is parallel to the first axis and for movement selectively towards and away from the one of the first and second rollers.

20. The combination according to claim 18 wherein the belt has a predetermined width and said first and second flanged pulleys each have a flange pair spaced to closely accept the width of the belt.

21. In combination:
 a) an endless power transmission belt having a length, inside and outside surfaces, and laterally spaced side surfaces,
 said belt further having a body with a cord embedded therein; and
 b) an apparatus for removing a portion of the cord that is exposed on a side surface of the power transmission belt, said apparatus comprising:
 a frame;
 a belt supporting structure on the frame including spaced first and second pulleys on which the endless power transmission belt is trained and run in an endless path;
 means on the frame for stabilizing the belt including first and second rollers between which the belt on said belt supporting structure passes;
 grinding means including first and second grinding wheels; and
 means for mounting the grinding wheels to the frame for movement one each towards and away from a side surface on the belt trained around the first and second pulleys to remove an exposed cord portion on the side surfaces of the belt trained around the first and second pulleys.

* * * * *